(12) United States Patent
Bates et al.

(10) Patent No.: US 11,378,786 B2
(45) Date of Patent: Jul. 5, 2022

(54) PROJECTION LENS WITH FOUR GLASS ELEMENTS HAVING SPHERICAL SURFACES

(71) Applicant: Snap Inc., Santa Monica, CA (US)

(72) Inventors: Robert Matthew Bates, Erie, CO (US); Adam Douglas Greengard, Lafayette, CO (US)

(73) Assignee: Snap Inc., Santa Monica, CA (US)

( * ) Notice: Subject to any disclaimer, the term of this patent is extended or adjusted under 35 U.S.C. 154(b) by 231 days.

(21) Appl. No.: 16/678,496

(22) Filed: Nov. 8, 2019

(65) Prior Publication Data

US 2020/0150405 A1 May 14, 2020

Related U.S. Application Data

(60) Provisional application No. 62/758,277, filed on Nov. 9, 2018.

(51) Int. Cl.
*G02B 13/16* (2006.01)
*G02B 9/34* (2006.01)

(52) U.S. Cl.
CPC .............. *G02B 13/16* (2013.01); *G02B 9/34* (2013.01)

(58) Field of Classification Search
CPC .................................. G02B 13/16; G02B 9/34
See application file for complete search history.

(56) References Cited

U.S. PATENT DOCUMENTS

| 2017/0329137 A1* | 11/2017 | Tervo | G02B 6/0026 |
| 2021/0041699 A1* | 2/2021 | Ukai | G02B 27/0172 |
| 2021/0157108 A1* | 5/2021 | Aikio | G02B 13/0035 |

FOREIGN PATENT DOCUMENTS

| CN | 112969953 A | 6/2021 |
| EP | 1385023 | 1/2004 |
| WO | 2018165123 | 9/2018 |
| WO | 2020/097478 | 5/2020 |

(Continued)

OTHER PUBLICATIONS

"International Application Serial No. PCT/US2019/060496, Invitation to Pay Additional Fees dated Apr. 6, 2020", 10 pgs.

(Continued)

*Primary Examiner* — Wen Huang
(74) *Attorney, Agent, or Firm* — Schwegman Lundberg & Woessner, P.A.

(57) ABSTRACT

A projection lens can include four lens elements, each lens element being formed from glass and including spherical or planar incident and exiting surfaces. Compared to a projection lens that uses three lens elements, the four-element projection lens has relaxed manufactured and alignment tolerances. Unlike a projection lens that uses one or more plastic elements or uses aspherical surfaces, the all-glass projection lens can be manufactured using relatively fast and inexpensive grinding and polishing techniques. One or two of the glass lens elements can optionally be formed symmetrically, so as to be reversible. One glass element can optionally be piano-convex. A right-angle prism can direct light from a video display into the four glass elements. An achromatic prism can angularly divert the optical axis by about eight degrees and can direct light out of the four glass elements into a near-eye waveguide.

16 Claims, 3 Drawing Sheets

(56) References Cited

FOREIGN PATENT DOCUMENTS

WO    2020097478    5/2020

OTHER PUBLICATIONS

"International Application Serial No. PCT/US2019/060496, International Search Report dated Jul. 3, 2020", 6 pgs.
"International Application Serial No. PCT/US2019/060496, Written Opinion dated Jul. 3, 2020", 7 pgs.
"International Application Serial No. PCT/US2019/060496, International Preliminary Report on Patentability dated May 20, 2021", 9 pgs.

* cited by examiner

PROJECTION LENS WITH FOUR GLASS ELEMENTS HAVING SPHERICAL SURFACES

PRIORITY CLAIM

This application claims the benefit of priority to U.S. Provisional Patent Application Ser. No. 62/758,277, filed on Nov. 9, 2018, the benefit of priority which is claimed hereby, and is incorporated by reference herein in its entirety.

FIELD OF THE DISCLOSURE

The present disclosure relates generally to optical systems suitable for use in near-eye displays.

BACKGROUND OF THE DISCLOSURE

A near-eye display can produce a video image, and direct the video image toward a human eye. In many cases, components in an optical system in a near-eye display can be difficult to manufacture and align, due to relatively tight tolerances, and/or expensive, due to relatively expensive manufacturing techniques.

As a result, there exists a need for a near-eye display optical system that has relatively loose tolerances and is manufacturable using relatively inexpensive manufacturing techniques.

Figure 1:
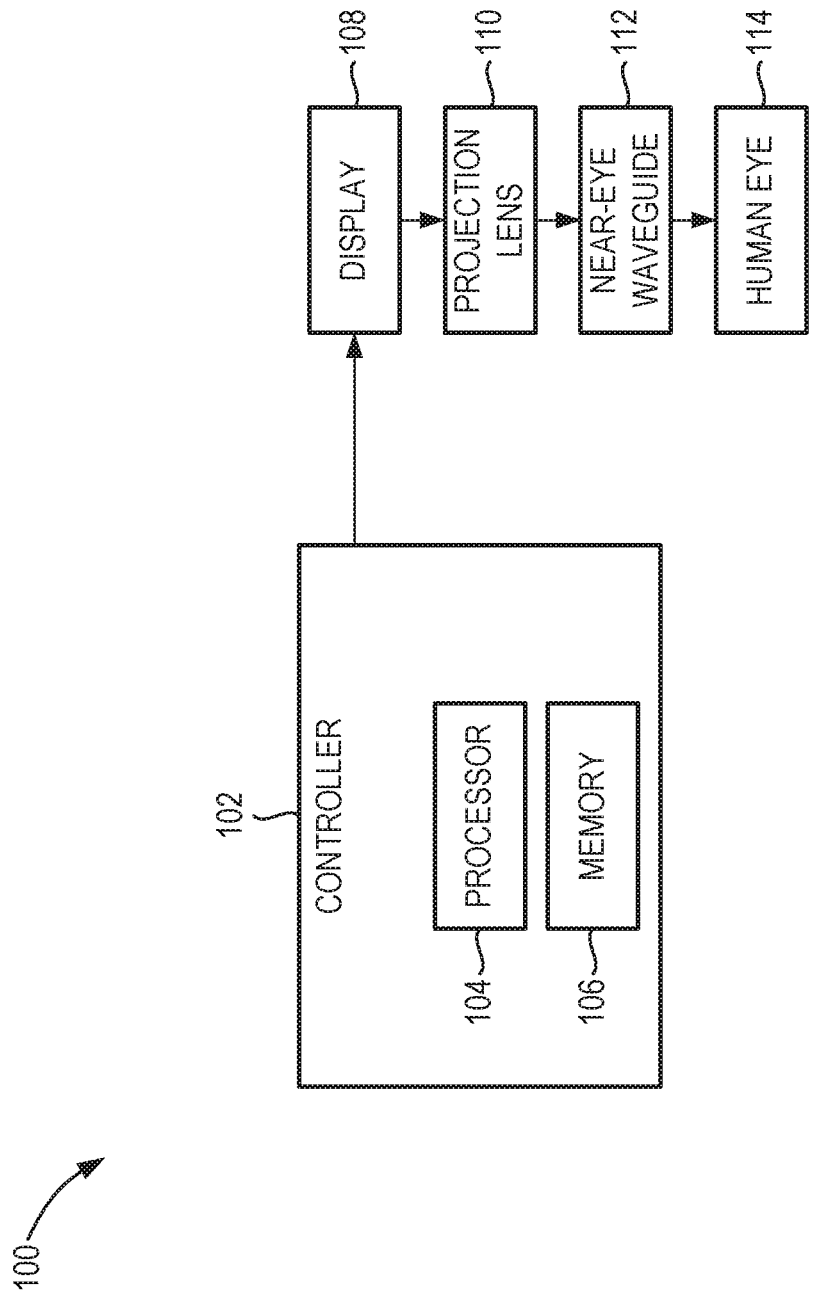
FIG. 1 shows a schematic view of an optical system suitable for use in a near-eye display, in accordance with some embodiments.

Corresponding reference characters indicate corresponding parts throughout the several views. Elements in the drawings are not necessarily drawn to scale. The configurations shown in the drawings are merely examples, and should not be construed as limiting the scope of the inventive subject matter in any manner.

DETAILED DESCRIPTION

A near-eye display can include a projection lens. The projection lens can include four lens elements, each lens element being formed from glass and including spherical or planar incident and exiting surfaces. Compared to a projection lens that uses three lens elements, the four-element projection lens can have relaxed manufactured and alignment tolerances. Unlike a projection lens that uses one or more plastic elements or uses aspherical surfaces, the all-glass projection lens can be manufactured using relatively fast and inexpensive grinding and polishing techniques. One or two of the glass lens elements can optionally be formed symmetrically, so as to be reversible. One glass element can optionally be plano-convex. A right-angle prism can direct light from a video display into the four glass elements. An achromatic prism can angularly divert the optical axis by about eight degrees and can direct light out of the four glass elements into a near-eye waveguide.

In the following discussion, the Abbe number (also known as V-number) of a material is defined as defined as the dimensionless quantity $(n_d-1)/(n_F-n_C)$, where nd is a refractive index of the material at a wavelength of 587.6 nm (helium d-line), $n_F$ is a refractive index of the material at a wavelength of 486.1 nm (hydrogen F-line), and $n_C$ is a refractive index of the material at a wavelength of 656.3 nm (hydrogen C-line). In general, the higher the Abbe number of a material, the lower the dispersion of the material.

In the discussion that follows, various optical elements are referred to as first lens element, second lens element, and so forth. It will be understood that the numbering scheme is provided merely for convenience, and to specify an order in which the numbered elements appear. In some examples, one or more additional optical elements can optionally appear between the numbered elements. For example, a planar spectral filter can appear before a first lens element, between a first lens element and a second lens element, between a second lens element and a third lens element, and so forth.

FIG. 1 shows a schematic view of an optical system 100 suitable for use in a near-eye display, in accordance with some embodiments. The configuration of FIG. 1 is but one configuration; other suitable configurations can also be used.

The optical system 100 can include a controller 102. The controller 102 can include circuitry that can convert data representing a video image into an electrical signal. The circuitry can include a processor 104. The circuitry can include memory 106. The memory 106 can include instructions that, when executed by the processor 104, cause the processor 104 to execute instructions. The instructions can include processing the electrical signal, storing and accessing stored video content, and the like. The controller 102 can direct a video signal to the display 108 to be displayed on the display 108. The controller 102 can include a processor 104 on or in the display 108, or can be coupled to a processor 104 away from the display 108 via a wired and/or wireless connection. The controller 102 can optionally receive data corresponding to the video signal from an external source, such as a video game console, a laptop or computer connected by a wired or wireless connection, a streaming video source, or others. In some examples, the display 108 can be a liquid crystal on silicon (LCOS) or a digital light processing (DLP) display, in which is illuminated externally. The display 108 can display a video image corresponding to the electrical signal. A projection lens 110 (discussed in detail below) can project the video image from the display 108 into a near-eye waveguide 112. The near-eye waveguide 112 can guide the projected video image to a location proximate a human eye 114. Light from the waveguide 112 can enter the human eye 114. The light can form a reproduced video image on the retina of the human eye 114, which corresponds to the video image displayed on the display 108 and the corresponding electrical signal.

The elements in FIG. 1 (except the human eye 114) can be packaged as a near-eye display, and can optionally be worn as eyewear, such as spectacles, or as a head-mounted display.

The projection lens 110 is discussed in detail below.

Figure 2:
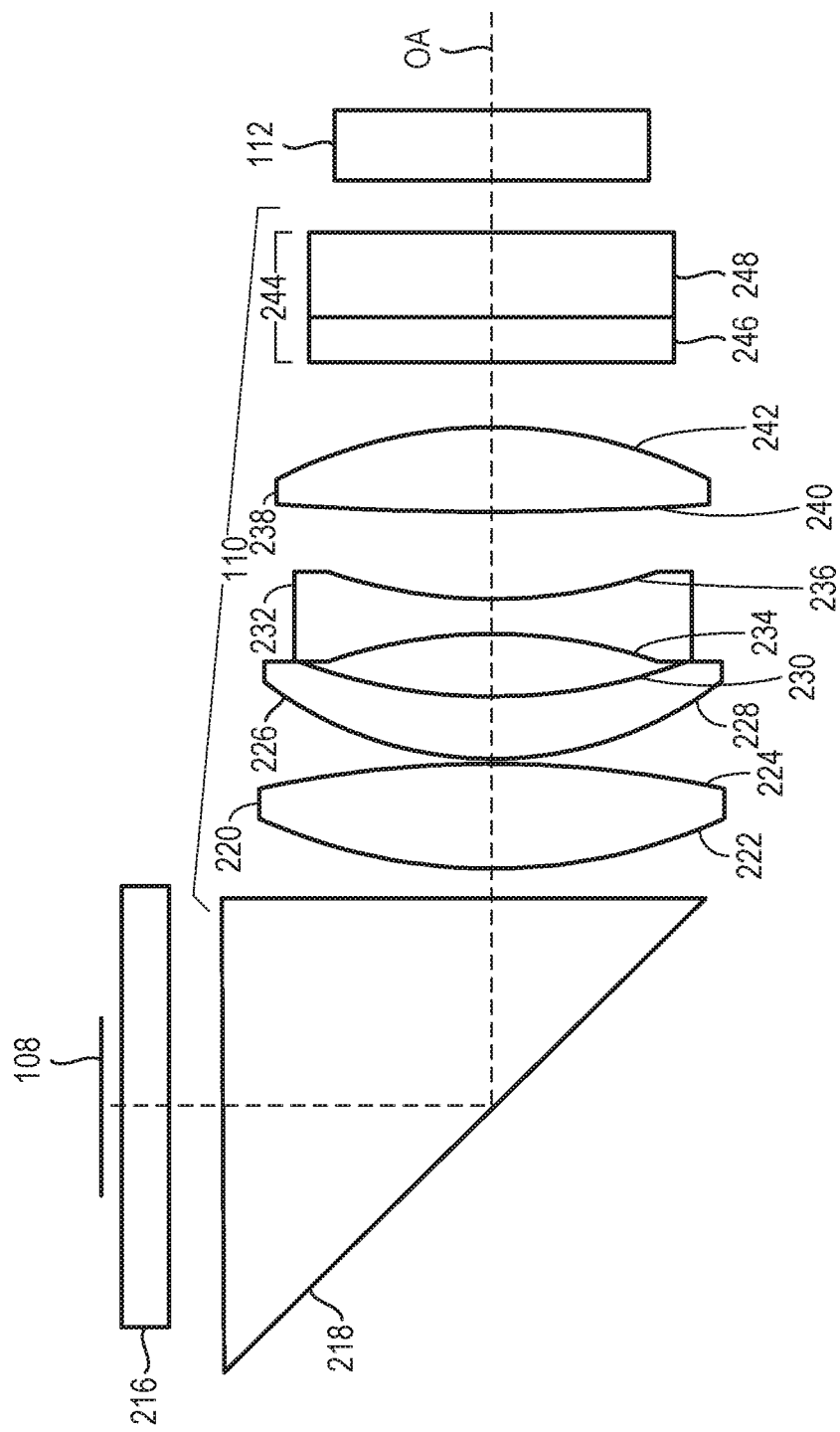
FIG. 2 shows a side view of an example of an optical system suitable for use in a near-eye display, in accordance with some embodiments.
Figure 3:
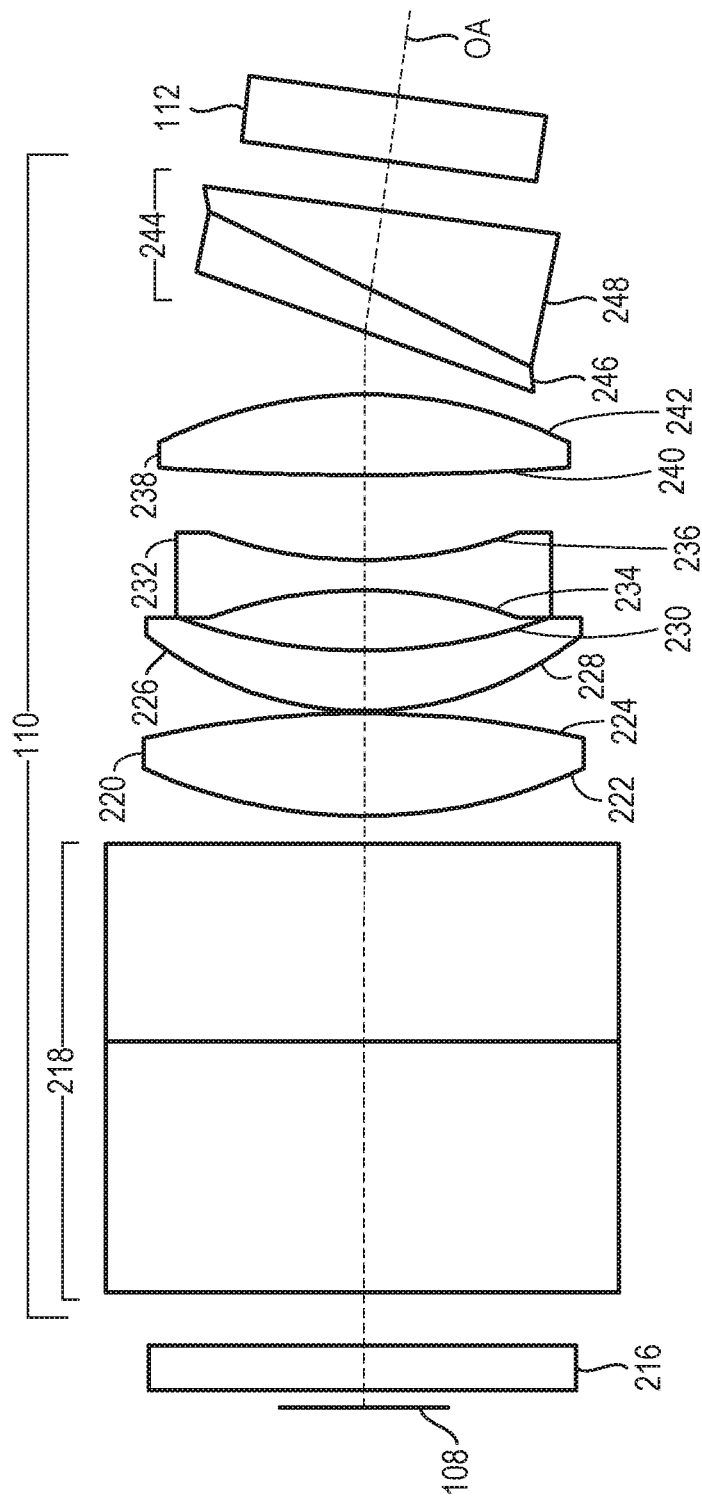
FIG. 3 shows a top view of the optical system of FIG. 2, where the right-angle prism is unfolded for clarity.

FIG. 2 shows a side view of an example of an optical system 110 suitable for use in a near-eye display, in accordance with some embodiments. FIG. 3 shows a top view of the optical system 110 of FIG. 2, where the right-angle prism is unfolded for clarity.

The display 108 can display video, which can include a sequence of images that refreshes at a video rate, such as 30 Hz, 60 Hz, 90 Hz, 120 Hz, or another suitable video rate. In some examples, the display 108 can include an array of pixels, each of which can be independently controlled.

In some examples, the display 108 can include sequential color illumination. For example, a red light emitting diode can be activated, and the pixels corresponding to the red portions of the image can be simultaneously activated to the "on" state. Then, a green light emitting diode can be activated, with corresponding pixels, followed by a blue light emitting diode with corresponding pixels. The red, green, and blue illumination and pixel activation can be cycled as needed to form a video image that includes contributions from the red, green, and blue pixels. In other examples, each pixel can include a red light-producing element, a green light-producing element, and a blue light-producing element, each of which are independently controllable to produce a desired intensity (e.g., brightness) and color for each pixel. In some examples, other suitable colors can be used. In some examples, each light-producing element can be a light-emitting diode. In some examples, each light-producing element can be a laser diode. In some examples, each light-producing element can include a white-light source followed by a suitable spectral filter. In some examples, the display 108 can be rectangular, square, oval, or another suitable shape. In some examples, the display 108 be relatively small, such as approximately 3 mm along an edge. Other sizes can also be used.

The display 108 can optionally be packaged behind a cover glass 216, which is typically a relatively thin glass element. The cover glass 216 is intended to protect the display 108 from dust and contamination, and generally does not play an optical role in the system.

A near-eye waveguide 112 can operably guide light toward a human eye 114 (FIG. 1). In some examples, the near-eye waveguide 112 can be shaped as an elongated element having a rectangular or square cross-section that remains constant along a longitudinal length of the near-eye waveguide 112. Other shapes and configurations can also be used for the near-eye waveguide 112. The projection lens 110 described below can receive light from the display 108 and direct the light into the near-eye waveguide 112. When the near-eye waveguide 112 is positioned suitably close to a human eye 114, the near-eye waveguide 112 can direct the light into the human eye 114.

A projection lens 110 having a positive total refractive power can direct light from the displayed video in a light ray bundle from the display 108 into the near-eye waveguide 112. The projection lens 110 can have an optical axis (OA) that corresponds to a center of the light ray bundle.

The projection lens 110 can include a right-angle prism 218 positioned along the optical axis (OA) adjacent the display 108. The right-angle prism 218 can angularly divert the optical axis (OA) by ninety degrees. In some examples, the angles can deviate away from the 45 degree/45 degree/90 degree geometry of a true right-angle prism 218, so that the angular diversion can deviate away from ninety degrees. Other suitable angular deviations can include ranges between 89 and 91 degrees, between 88 and 92 degrees, between 85 and 95 degrees, and others. The right-angle prism 218 can be formed from a crown glass having a refractive index greater than or equal to 1.728 at a wavelength of 587.6 nm and an Abbe number (which measures a glass's dispersion, or its variation in refractive index as a function of wavelength) greater than 50. Suitable high-index crown glasses can include H-LAK52, having a refractive index of 1.729 at a wavelength of 587.6 nm and an Abbe number of 54.7. Other suitable high-index crown glasses can also be used.

The projection lens 110 can include a first lens element 220 positioned along the optical axis (OA) and formed from a first glass having a refractive index between 1.72 and 1.85 at a wavelength of 587.6 nm and an Abbe number between 40 and 55. Suitable glasses can include H-LAF50B (having a refractive index of 1.773 at a wavelength of 587.6 nm and an Abbe number of 49.6), KLASKN1, HLAK53B, and others. The first lens element 220 can have a convex spherical first incident surface 222 facing the right-angle prism 218 and a convex spherical first exiting surface 224 facing away from the display 108. In some examples, the first incident surface 222 and the first exiting surface 224 can have a same radius of curvature, which can simplify a manufacturing process for the first lens element 220. The first incident surface 222, the first exiting surface 224, and the first glass can define a refractive power of the first lens element 220 to be positive and between 88% and 128% of the total refractive power, positive and between 112% and 128% of the total refractive power, or in another suitable range.

The projection lens 110 can include a second lens element 226 positioned along the optical axis (OA) and formed from second glass having a refractive index between 1.72 and 1.85 at a wavelength of 587.6 nm and an Abbe number between 38 and 55. Suitable glasses can include H-ZLAF50E (having a refractive index of 1.804 at a wavelength of 587.6 nm and an Abbe number of 46.6). D-ZLAF85L, SLAH59, TAF3D, and others. The second lens element 226 can have a convex spherical second incident surface 228 facing the first lens element 220 and a concave spherical second exiting surface 230 facing away from the first lens element 220. The second incident surface 228, the second exiting surface 230, and the second glass can define a refractive power of the second lens element 226 to be positive and between 35% and 68% of the total refractive power, positive and between 35% and 54% of the total refractive power, or in another suitable range. In some examples, the refractive power of the second lens element 226, divided by the refractive power of the first lens element 220, can be between 0.28 and 0.71, between 0.28 and 0.46, or in another suitable range.

The projection lens 110 can include a third lens element 232 positioned along the optical axis (OA) and formed from a third glass having a refractive index greater than 1.8 at a wavelength of 587.6 nm and an Abbe number between 20 and 24. Suitable glasses can include H-ZF62 (having a refractive index of 1.923 at a wavelength of 587.6 nm and an Abbe number of 20.9), KPSFN 1M, and others. The third lens element 232 can have a concave spherical third incident surface 234 facing the second lens element 226 and a concave spherical third exiting surface 236 facing away from the second lens element 226. In some examples, the third incident surface 234 and the third exiting surface 236 can have a same radius of curvature, which can simplify a manufacturing process for the third lens element 232. The third incident surface 234, the third exiting surface 236, and the third glass can define a refractive power of the third lens element 232 to be negative and between 165% and 216% of the total refractive power, negative and between 183% and 216% of the total refractive power, or in another suitable range.

The projection lens 110 can include a fourth lens element 238 positioned along the optical axis (OA) and formed from a fourth glass having a refractive index greater than 1.85 at a wavelength of 587.6 nm and an Abbe number between 28 and 35. Suitable glasses can include H-ZLAF75B (having a refractive index of 1.904 at a wavelength of 587.6 nm and an Abbe number of 31.4), TAFD55, H-ZLAF76, and others. The fourth lens element 238 can have a convex spherical or planar fourth incident surface 240 facing the third lens element 232 and a convex spherical fourth exiting surface facing away from the third lens element 232 toward the near-eye waveguide 112. The fourth incident surface 240, the fourth exiting surface 242, and the fourth glass can define a refractive power of the fourth lens element 238 to be positive and between 87% and 125% of the total refractive power, positive and between 91% and 125% of the total refractive power, or in another suitable range. In some examples, the refractive power of the fourth lens element 238, divided by the refractive power of the third lens element 232, can be between −0.64 and −0.49, between −0.60 and −0.49, or in another suitable range.

In some examples, the first incident surface 222, the first exiting surface 224, the second incident surface 228, the second exiting surface 230, the third incident surface 234, the third exiting surface 236, the fourth incident surface 240 (for cases in which the fourth incident surface 240 is spherical. e.g., non-planar), and the fourth exiting surface 242 have centers that are collinear along the optical axis (OA). Specifically, each of these surfaces can have a vertex that intersects the optical axis (OA).

In general, the glass materials for the first lens element 220, the second lens element 226, the third lens element 232, the fourth lens element 238, and the right-angle prism 218 can be selected to reduce or minimize chromatic aberration, at a system level (e.g., one or more elements having a positive chromatic aberration, one or more elements have a negative chromatic aberration, and the net summed chromatic aberration being at or close to zero), for light passing through these elements.

The projection lens 110 can include an achromatic prism 244 positioned along the optical axis (OA) between the fourth lens element 238 and the near-eye waveguide 112. The achromatic prism 244 can angularly divert the optical axis (OA) by an angle between seven degrees and nine degrees, such as eight degrees. Other suitable angular diversions can also be used, such as a range between six degrees and ten degrees, between three degrees and thirteen degrees, and others.

In some examples, the achromatic prism 244 can be formed from a first prism element 246, facing the fourth lens element 238, in contact with a second prism element 248, facing the near-eye waveguide 112. In some examples, the first prism element 246 can be formed from a flint glass having a refractive index between 1.85 and 2.01 at a wavelength of 587.6 nm and an Abbe number between 18.0 and 23.8. Suitable glasses can include H-ZF52 (having a refractive index of 1.847 at a wavelength of 587.6 nm and an Abbe number of 23.8), P-SF68. H-ZF88, H-ZF72A, H-ZF62, and others. In some examples, the second prism element 248 can be formed from a crown glass having a refractive index of 1.73 at a wavelength of 587.6 nm and an Abbe number of 54.7. Suitable glasses can include H-LAK52 (having a refractive index of 1.729 at a wavelength of 587.6 nm and an Abbe number of 54.7), and others. In some examples, the glasses for the first prism element 246 and the second prism element 248 can be selected to reduce or minimize the chromatic aberration of the achromatic prism 244 (e.g., so that the net chromatic aberration of the achromatic prism 244, alone, is zero or a relatively small value).

In some examples, the projection lens 110 can operate over a wavelength range of 460 nm to 620 nm, inclusive. Other suitable wavelength ranges can also be used, including 400 nm to 700 nm (typically considered to be a full wavelength range of typical human vision), and others.

The f/# of a lens can quantify the cone of light captured by the lens for a single object point. Specifically, for a single pixel on the display 108, the f/# can characterize the size of the angular range, from the pixel, that is captured by the projection lens 110. In some examples, f/# can be related to an amount of light captured by the lens. For example, a relatively low f/# means that more light is captured by the lens, and an image formed by the lens is relatively bright. Similarly, a higher f/# means that less light is captured by the lens, and an image formed by the lens is relatively dim. In some examples, the projection lens 110 can operate at an f/# of 2.08, which corresponds to a numerical aperture of 0.24 at the display 108, or a half-angle of about 14 degrees at the display 108. Other suitable values can also be used.

The field of view of a lens can quantify how much area of an object is captured by the lens. Specifically, the field of view should include all (or nearly all) of the display 108, so that the lens captures light from pixels at the edge of the display 108. In some examples, the projection lens 110 can have a field of view of 25 degrees, diagonal. Other suitable values can also be used.

The effective focal length is a distance between a rear principal point of a lens and a rear focal point of the lens. Both the rear principal point and the rear focal point are locations in the lens. Both are mathematical constructs, rather than tangible physical elements of a lens. In some examples, the projection lens 110 can have an effective focal length of 8.32 mm. Other suitable values can also be used.

The distortion of a lens is one measure of how accurately pixel locations are mapped between an object and a corresponding image. In the complete absence of distortion, a square object is mapped to a square image, with the square image having perfectly straight sides. In practice, it is generally difficult to completely eliminate distortion, so a lens designer often attempts to reduce distortion as much as is practical, and expresses a residual distortion as a percentage of an image height. In some examples, the projection lens 110 can have a distortion of 0.75% at an image height of 1.86 mm. Other suitable values can also be used.

The telecentricity of a lens can affect a brightness of an image formed by the lens. For a projection lens 110 with a display that is externally illuminated (e.g., a multi-pixel attenuator that attenuates light from a light source), telecentricity is desirable, so that pixels at the edge of the image are as bright as pixels in the center of the image. In some examples, the projection lens 110 can have a telecentricity of less than 0.5 degree (chief ray angle) at the edge of the image field (e.g., corresponding to a diagonal corner of the display 108). A quantity related to telecentricity is relative illumination. In some examples, the projection lens 110 can have a relative illumination (relative to a center of the image) of greater than or equal to 80% at an image height of 1.86 mm. Other suitable values can also be used.

In general thermal performance of a lens can be important. For example, it can be desirable to manage thermal expansion of the lens materials, and thermal variations in refractive index, so that the lens performance suitably well over a range of temperatures. In some examples, the projection lens 110 can have an athermal operation over a temperature range of seventy degrees. Other suitable values can also be used.

In some examples, the exit pupil of the projection lens 110 can be external to the lens elements. For example, the exit pupil can be located at or near an area on the near-eye waveguide 112 at which light enters the near-eye waveguide 112. In some examples, the distance between an external aperture stop to a vertex of the exiting surface of the fourth lens element 238 can be between 3.4 mm to 3.6 mm. Other suitable values can also be used.

In some examples, a total lens length can represent a distance in air between a vertex of the incident surface of the first lens element 220 and a vertex of the exiting surface of the fourth lens element 238. In some examples, the total lens length can be 6.59 mm. Other suitable values can also be used.

In some examples, an object distance can represent a distance in air between the display 108 and a vertex of the first incident surface 222 of the first lens element 220. In some examples, the object distance can be 6.1 mm. Other suitable values can also be used.

While this invention has been described as having example designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

To further illustrate the device disclosed herein, a non-limiting list of examples is provided below. Each of the following non-limiting examples can stand on its own, or can be combined in any permutation or combination with any one or more of the other examples.

In Example 1, an optical system can include: a projection lens having a positive total refractive power and configured to direct light in a light ray bundle from a display into a near-eye waveguide, the projection lens having an optical axis that corresponds to a center of the light ray bundle, the projection lens comprising: a first lens element positioned along the optical axis, the first lens element having a convex spherical first incident surface facing the display and a convex spherical first exiting surface facing away from the display; a second lens element positioned along the optical axis, the second lens element having a convex spherical second incident surface facing the first lens element and a concave spherical second exiting surface facing away from the first lens element; a third lens element positioned along the optical axis, the third lens element having a concave spherical third incident surface facing the second lens element and a concave spherical third exiting surface facing away from the second lens element; and a fourth lens element positioned along the optical axis, the fourth lens element having a convex spherical or planar fourth incident surface facing the third lens element and a convex spherical fourth exiting surface facing away from the third lens element.

In Example 2, the optical system of Example 1 can optionally be further configured such that the first lens element is formed from a first glass having a refractive index between 1.72 and 1.85 at a wavelength of 587.6 nm and an Abbe number between 40 and 55; the second lens element is formed from second glass having a refractive index between 1.72 and 1.85 at a wavelength of 587.6 nm and an Abbe number between 38 and 55; the third lens element is formed from a third glass having a refractive index greater than 1.8 at a wavelength of 587.6 nm and an Abbe number between 20 and 24; and the fourth lens element is formed from a fourth glass having a refractive index greater than 1.85 at a wavelength of 587.6 nm and an Abbe number between 28 and 35.

In Example 3, the optical system of any one of Examples 1-2 can optionally be further configured such that the first incident surface, the first exiting surface, and the first glass define a refractive power of the first lens element to be positive and between 88% and 128% of the total refractive power; the second incident surface, the second exiting surface, and the second glass define a refractive power of the second lens element to be positive and between 35% and 68% of the total refractive power; the third incident surface, the third exiting surface, and the third glass define a refractive power of the third lens element to be negative and between 165% and 216% of the total refractive power; and the fourth incident surface, the fourth exiting surface, and the fourth glass define a refractive power of the fourth lens element to be positive and between 87% and 125% of the total refractive power.

In Example 4, the optical system of any one of Examples 1-3 can optionally be further configured such that the refractive power of the second lens element, divided by the refractive power of the first lens element, is between 0.28 and 0.71; and the refractive power of the fourth lens element, divided by the refractive power of the third lens element, is between −0.64 and −0.49.

In Example 5, the optical system of any one of Examples 1-4 can optionally be further configured such that the first incident surface, the first exiting surface, and the first glass define a refractive power of the first lens element to be positive and between 112% and 128% of the total refractive power; the second incident surface, the second exiting surface, and the second glass define a refractive power of the second lens element to be positive and between 35% and 54% of the total refractive power; the third incident surface, the third exiting surface, and the third glass define a refractive power of the third lens element to be negative and between 183% and 216% of the total refractive power; and the fourth incident surface, the fourth exiting surface, and the fourth glass define a refractive power of the fourth lens element to be positive and between 91% and 125% of the total refractive power.

In Example 6, the optical system of any one of Examples 1-5 can optionally be further configured such that the refractive power of the second lens element, divided by the refractive power of the first lens element, is between 0.28 and 0.46; and the refractive power of the fourth lens element, divided by the refractive power of the third lens element, is between −0.60 and −0.49.

In Example 7, the optical system of any one of Examples 1-6 can optionally be further configured such that the first incident surface and the first exiting surface have a same radius of curvature.

In Example 8, the optical system of any one of Examples 1-7 can optionally be further configured such that the third incident surface and the third exiting surface have a same radius of curvature.

In Example 9, the optical system of any one of Examples 1-8 can optionally be further configured such that the fourth incident surface is planar.

In Example 10, the optical system of any one of Examples 1-9 can optionally further include a display configured to display video and direct light from the displayed video into the projection lens; a controller configured to direct a video signal to the display to be displayed on the display; and a near-eye waveguide configured to receive light from the projection lens and operably guide the received light toward a human eye.

In Example 11, the optical system of any one of Examples 1-10 can optionally be further configured such that the projection lens further comprises a right-angle prism positioned along the optical axis between the display and the first lens element, the right-angle prism configured to angularly divert the optical axis by ninety degrees, the right-angle prism being formed from a crown glass having a refractive index greater than or equal to 1.728 at a wavelength of 587.6 nm and an Abbe number greater than 50.

In Example 12, the optical system of any one of Examples 1-11 can optionally be further configured such that the projection lens further comprises an achromatic prism positioned along the optical axis between the near-eye waveguide and the fourth lens element and configured to angularly divert the optical axis by an angle between seven degrees and nine degrees.

In Example 13, the optical system of any one of Examples 1-12 can optionally be further configured such that the achromatic prism is formed from a first prism element, facing the fourth lens element, in contact with a second prism element, facing the near-eye waveguide; the first prism is formed from a flint glass having a refractive index between 1.85 and 2.01 at a wavelength of 587.6 nm and an Abbe number between 18.0 and 23.8; and the second prism is formed from a crown glass having a refractive index of 1.73 at a wavelength of 587.6 nm and an Abbe number of 54.7.

In Example 14, an optical system can include: a projection lens having a positive total refractive power and configured to direct light in a light ray bundle from a display into a near-eye waveguide, the projection lens having an optical axis that corresponds to a center of the light ray bundle, the projection lens comprising: a right-angle prism positioned along the optical axis adjacent the display, the right-angle prism configured to angularly divert the optical axis by ninety degrees; a first lens element positioned along the optical axis, the first lens element having a convex spherical first incident surface facing the right-angle prism and a convex spherical first exiting surface facing away from the display; a second lens element positioned along the optical axis, the second lens element having a convex spherical second incident surface facing the first lens element and a concave spherical second exiting surface facing away from the first lens element; a third lens element positioned along the optical axis, the third lens element having a concave spherical third incident surface facing the second lens element and a concave spherical third exiting surface facing away from the second lens element; a fourth lens element positioned along the optical axis, the fourth lens element having a convex spherical or planar fourth incident surface facing the third lens element and a convex spherical fourth exiting surface facing away from the third lens element toward the near-eye waveguide; and an achromatic prism positioned along the optical axis between the fourth lens element and the near-eye waveguide, the achromatic prism configured to angularly divert the optical axis by an angle between seven degrees and nine degrees; wherein the first incident surface, the first exiting surface, the second incident surface, the second exiting surface, the third incident surface, the third exiting surface, and the fourth exiting surface have centers that are collinear along the optical axis.

In Example 15, the optical system of Example 14 can optionally be configured such that the right-angle prism is formed from a crown glass having a refractive index greater than or equal to 1.728 at a wavelength of 587.6 nm and an Abbe number greater than 50; the first lens element is formed from a first glass having a refractive index between 1.72 and 1.85 at a wavelength of 587.6 nm and an Abbe number between 40 and 55; the second lens element is formed from second glass having a refractive index between 1.72 and 1.85 at a wavelength of 587.6 nm and an Abbe number between 38 and 55; the third lens element is formed from a third glass having a refractive index greater than 1.8 at a wavelength of 587.6 nm and an Abbe number between 20 and 24; and the fourth lens element is formed from a fourth glass having a refractive index greater than 1.85 at a wavelength of 587.6 nm and an Abbe number between 28 and 35.

In Example 16, the optical system of any one of Examples 14-15 can optionally be configured such that the first incident surface, the first exiting surface, and the first glass define a refractive power of the first lens element to be positive and between 88% and 128% of the total refractive power; the second incident surface, the second exiting surface, and the second glass define a refractive power of the second lens element to be positive and between 35% and 68% of the total refractive power; the third incident surface, the third exiting surface, and the third glass define a refractive power of the third lens element to be negative and between 165% and 216% of the total refractive power; the fourth incident surface, the fourth exiting surface, and the fourth glass define a refractive power of the fourth lens element to be positive and between 87% and 125% of the total refractive power; the refractive power of the second lens element, divided by the refractive power of the first lens element, is between 0.28 and 0.71; and the refractive power of the fourth lens element, divided by the refractive power of the third lens element, is between −0.64 and −0.49.

In Example 17, the optical system of any one of Examples 14-16 can optionally be configured such that the first incident surface, the first exiting surface, and the first glass define a refractive power of the first lens element to be positive and between 112% and 128% of the total refractive power; the second incident surface, the second exiting surface, and the second glass define a refractive power of the second lens element to be positive and between 35% and 54% of the total refractive power; the third incident surface, the third exiting surface, and the third glass define a refractive power of the third lens element to be negative and between 183% and 216% of the total refractive power; the fourth incident surface, the fourth exiting surface, and the fourth glass define a refractive power of the fourth lens element to be positive and between 91% and 125% of the total refractive power; the refractive power of the second lens element, divided by the refractive power of the first lens element, is between 0.28 and 0.46; and the refractive power of the fourth lens element, divided by the refractive power of the third lens element, is between −0.60 and −0.49.

In Example 18, the optical system of any one of Examples 14-17 can optionally be configured such that the first incident surface and the first exiting surface have a same radius of curvature; the third incident surface and the third exiting surface have a same radius of curvature; and the fourth incident surface is planar.

In Example 19, an optical system can include: a display configured to display video; a controller configured to direct a video signal to the display to be displayed on the display; a near-eye waveguide configured to operably guide light toward a human eye; a projection lens having a positive total refractive power and configured to direct light from the displayed video in a light ray bundle from the display into the near-eye waveguide, the projection lens having an optical axis that corresponds to a center of the light ray bundle, the projection lens comprising: a right-angle prism positioned along the optical axis adjacent the display, the right-angle prism configured to angularly divert the optical axis by ninety degrees, the right-angle prism being formed from a crown glass having a refractive index greater than or equal to 1.728 at a wavelength of 587.6 nm and an Abbe number greater than 50; a first lens element positioned along the optical axis and formed from a first glass having a refractive index between 1.72 and 1.85 at a wavelength of 587.6 nm and an Abbe number between 40 and 55, the first lens element having a convex spherical first incident surface facing the right-angle prism and a convex spherical first exiting surface facing away from the display, wherein the first incident surface, the first exiting surface, and the first glass define a refractive power of the first lens element to be positive and between 88% and 128% of the total refractive power; a second lens element positioned along the optical axis and formed from second glass having a refractive index between 1.72 and 1.85 at a wavelength of 587.6 nm and an Abbe number between 38 and 55, the second lens element having a convex spherical second incident surface facing the first lens element and a concave spherical second exiting surface facing away from the first lens element, wherein the second incident surface, the second exiting surface, and the second glass define a refractive power of the second lens element to be positive and between 35% and 68% of the total refractive power, wherein the refractive power of the second lens element, divided by the refractive power of the first lens element, is between 0.28 and 0.71; a third lens element positioned along the optical axis and formed from a third glass having a refractive index greater than 1.8 at a wavelength of 587.6 nm and an Abbe number between 20 and 24, the third lens element having a concave spherical third incident surface facing the second lens element and a concave spherical third exiting surface facing away from the second lens element, the third incident surface and the third exiting surface having a same radius of curvature, wherein the third incident surface, the third exiting surface, and the third glass define a refractive power of the third lens element to be negative and between 165% and 216% of the total refractive power; a fourth lens element positioned along the optical axis and formed from a fourth glass having a refractive index greater than 1.85 at a wavelength of 587.6 nm and an Abbe number between 28 and 35, the fourth lens element having a convex spherical or planar fourth incident surface facing the third lens element and a convex spherical fourth exiting surface facing away from the third lens element toward the near-eye waveguide, wherein the fourth incident surface, the fourth exiting surface, and the fourth glass define a refractive power of the fourth lens element to be positive and between 87% and 125% of the total refractive power, wherein the refractive power of the fourth lens element, divided by the refractive power of the third lens element, is between −0.64 and −0.49; and an achromatic prism positioned along the optical axis between the fourth lens element and the near-eye waveguide, the achromatic prism configured to angularly divert the optical axis by an angle between seven degrees and nine degrees; wherein the first incident surface, the first exiting surface, the second incident surface, the second exiting surface, the third incident surface, the third exiting surface, and the fourth exiting surface have centers that are collinear along the optical axis.

In Example 20, the optical system of Example 19 can optionally be configured such that the first incident surface, the first exiting surface, and the first glass define a refractive power of the first lens element to be positive and between 112% and 128% of the total refractive power; the second incident surface, the second exiting surface, and the second glass define a refractive power of the second lens element to be positive and between 35% and 54% of the total refractive power; the third incident surface, the third exiting surface, and the third glass define a refractive power of the third lens element to be negative and between 183% and 216% of the total refractive power; the fourth incident surface, the fourth exiting surface, and the fourth glass define a refractive power of the fourth lens element to be positive and between 91% and 125% of the total refractive power; the refractive power of the first lens element, divided by the refractive power of the second lens element, is between −0.60 and −0.49; and the refractive power of the third lens element, divided by the refractive power of the fourth lens element, is between 0.28 and 0.46.

What is claimed is:

1. An optical system, comprising:
a projection lens having a positive total refractive power and configured to direct light in a light ray bundle from a display into a near-eye waveguide, the projection lens having an optical axis that corresponds to a center of the light ray bundle, the projection lens comprising:
a first lens element positioned along the optical axis, the first lens element having a convex spherical first incident surface facing the display and a convex spherical first exiting surface facing away from the display;
a second lens element positioned along the optical axis, the second lens element having a convex spherical second incident surface facing the first lens element and a concave spherical second exiting surface facing away from the first lens element;
a third lens element positioned along the optical axis, the third lens element having a concave spherical third incident surface facing the second lens element and a concave spherical third exiting surface facing away from the second lens element; and
a fourth lens element positioned along the optical axis, the fourth lens element having a convex spherical or planar fourth incident surface facing the third lens element and a convex spherical fourth exiting surface facing away from the third lens element,
wherein:
the first lens element is formed from a first glass having a refractive index between 1.72 and 1.85 at a wavelength of 587.6 nm and an Abbe number between 40 and 55:
the second lens element is formed from second glass having a refractive index between 1.72 and 1.85 at a wavelength of 587.6 nm and an Abbe number between 38 and 55;
the third lens element is formed from a third glass having a refractive index greater than 1.8 at a wavelength of 587.6 nm and an Abbe number between 20 and 24; and
the fourth lens element is formed from a fourth glass having a refractive index greater than 1.85 at a wavelength of 587.6 nm and an Abbe number between 28 and 35.

2. The optical system of claim 1, wherein:
the first incident surface, the first exiting surface, and the first glass define a refractive power of the first lens element to be positive and between 88% and 128% of the total refractive power;
the second incident surface, the second exiting surface, and the second glass define a refractive power of the second lens element to be positive and between 35% and 68% of the total refractive power;
the third incident surface, the third exiting surface, and the third glass define a refractive power of the third lens element to be negative and between 165% and 216% of the total refractive power; and
the fourth incident surface, the fourth exiting surface, and the fourth glass define a refractive power of the fourth lens element to be positive and between 87% and 125% of the total refractive power.

3. The optical system of claim 2, wherein:
the refractive power of the second lens element, divided by the refractive power of the first lens element, is between 0.28 and 0.71; and
the refractive power of the fourth lens element, divided by the refractive power of the third lens element, is between −0.64 and −0.49.

4. The optical system of claim 1, wherein:
the first incident surface, the first exiting surface, and the first glass define a refractive power of the first lens element to be positive and between 112% and 128% of the total refractive power;
the second incident surface, the second exiting surface, and the second glass define a refractive power of the second lens element to be positive and between 35% and 54% of the total refractive power;
the third incident surface, the third exiting surface, and the third glass define a refractive power of the third lens element to be negative and between 183% and 216% of the total refractive power; and
the fourth incident surface, the fourth exiting surface, and the fourth glass define a refractive power of the fourth lens element to be positive and between 91% and 125% of the total refractive power.

5. The optical system of claim 4, wherein:
the refractive power of the second lens element, divided by the refractive power of the first lens element, is between 0.28 and 0.46; and
the refractive power of the fourth lens element, divided by the refractive power of the third lens element, is between −0.60 and −0.49.

6. The optical system of claim 1, wherein the first incident surface and the first exiting surface have a same radius of curvature.

7. The optical system of claim 1, wherein the third incident surface and the third exiting surface have a same radius of curvature.

8. The optical system of claim 1, wherein the fourth incident surface is planar.

9. An optical system comprising:
a projection lens having a positive total refractive power and configured to direct light in a light ray bundle from a display into a near-eye waveguide, the projection lens having an optical axis that corresponds to a center of the light ray bundle, the projection lens comprising:
a first lens element positioned along the optical axis, the first lens element having a convex spherical first incident surface facing the display and a convex spherical first exiting surface facing away from the display;
a second lens element positioned along the optical axis, the second lens element having a convex spherical second incident surface facing the first lens element and a concave spherical second exiting surface facing away from the first lens element;
a third lens element positioned along the optical axis, the third lens element having a concave spherical third incident surface facing the second lens element and a concave spherical third exiting surface facing away from the second lens element;
a fourth lens element positioned along the optical axis, the fourth lens element having a convex spherical or planar fourth incident surface facing the third lens element and a convex spherical fourth exiting surface facing away from the third lens element;

a display configured to display video and direct light from the displayed video into the projection lens;
a controller configured to direct a video signal to the display to be displayed on the display; and
a near-eye waveguide configured to receive light from the projection lens and operably guide the received light toward a human eye,
wherein:
the projection lens further comprises an achromatic prism positioned along the optical axis between the near-eye waveguide and the fourth lens element and configured to angularly divert the optical axis by an angle between seven degrees and nine degrees;
the achromatic prism is formed from a first prism element, facing the fourth lens element, in contact with a second prism element, facing the near-eye waveguide;
the first prism is formed from a flint glass having a refractive index between 1.85 and 2.01 at a wavelength of 587.6 nm and an Abbe number between 18.0 and 23.8; and
the second prism is formed from a crown glass having a refractive index of 1.73 at a wavelength of 587.6 nm and an Abbe number of 54.7.

10. The optical system of claim 9, wherein the projection lens further comprises a right-angle prism positioned along the optical axis between the display and the first lens element, the right-angle prism configured to angularly divert the optical axis by ninety degrees, the right-angle prism being formed from a crown glass having a refractive index greater than or equal to 1.728 at a wavelength of 587.6 nm and an Abbe number greater than 50.

11. An optical system, comprising:
a projection lens having a positive total refractive power and configured to direct light in a light ray bundle from a display into a near-eye waveguide, the projection lens having an optical axis that corresponds to a center of the light ray bundle, the projection lens comprising:
a right-angle prism positioned along the optical axis adjacent the display, the right-angle prism configured to angularly divert the optical axis by ninety degrees;
a first lens element positioned along the optical axis, the first lens element having a convex spherical first incident surface facing the right-angle prism and a convex spherical first exiting surface facing away from the display;
a second lens element positioned along the optical axis, the second lens element having a convex spherical second incident surface facing the first lens element and a concave spherical second exiting surface facing away from the first lens element;
a third lens element positioned along the optical axis, the third lens element having a concave spherical third incident surface facing the second lens element and a concave spherical third exiting surface facing away from the second lens element;
a fourth lens element positioned along the optical axis, the fourth lens element having a convex spherical or planar fourth incident surface facing the third lens element and a convex spherical fourth exiting surface facing away from the third lens element toward the near-eye waveguide; and
an achromatic prism positioned along the optical axis between the fourth lens element and the near-eye waveguide, the achromatic prism configured to angularly divert the optical axis by an angle between seven degrees and nine degrees;

wherein the first incident surface, the first exiting surface, the second incident surface, the second exiting surface, the third incident surface, the third exiting surface, and the fourth exiting surface have centers that are collinear along the optical axis, wherein the right-angle prism is formed from a crown glass having a refractive index greater than or equal to 1.728 at a wavelength of 587.6 nm and an Abbe number greater than 50;

the first lens element is formed from a first glass having a refractive index between 1.72 and 1.85 at a wavelength of 587.6 nm and an Abbe number between 40 and 55;

the second lens element is formed from second glass having a refractive index between 1.72 and 1.85 at a wavelength of 587.6 nm and an Abbe number between 38 and 55;

the third lens element is formed from a third glass having a refractive index greater than 1.8 at a wavelength of 587.6 nm and an Abbe number between 20 and 24; and the fourth lens element is formed from a fourth glass having a refractive index greater than 1.85 at a wavelength of 587.6 nm and an Abbe number between 28 and 35.

12. The optical system of claim 11, wherein:

the first incident surface, the first exiting surface, and the first glass define a refractive power of the first lens element to be positive and between 88% and 128% of the total refractive power;

the second incident surface, the second exiting surface, and the second glass define a refractive power of the second lens element to be positive and between 35% and 68% of the total refractive power;

the third incident surface, the third exiting surface, and the third glass define a refractive power of the third lens element to be negative and between 165% and 216% of the total refractive power;

the fourth incident surface, the fourth exiting surface, and the fourth glass define a refractive power of the fourth lens element to be positive and between 87% and 125% of the total refractive power;

the refractive power of the second lens element, divided by the refractive power of the first lens element, is between 0.28 and 0.71; and the refractive power of the fourth lens element, divided by the refractive power of the third lens element; is between −0.64 and −0.49.

13. The optical system of claim 11, wherein:

the first incident surface, the first exiting surface, and the first glass define a refractive power of the first lens element to be positive and between 112% and 128% of the total refractive power;

the second incident surface, the second exiting surface, and the second glass define a refractive power of the second lens element to be positive and between 35% and 54% of the total refractive power;

the third incident surface, the third exiting surface, and the third glass define a refractive power of the third lens element to be negative and between 183% and 216% of the total refractive power;

the fourth incident surface, the fourth exiting surface, and the fourth glass define a refractive power of the fourth lens element to be positive and between 91% and 125% of the total refractive power;

the refractive power of the second lens element, divided by the refractive power of the first lens element, is between 0.28 and 0.46; and the refractive power of the fourth lens element, divided by the refractive power of the third lens element, is between −0.60 and −0.49.

14. The optical system of claim 13, wherein:

the first incident surface and the first exiting surface have a same radius of curvature;

the third incident surface and the third exiting surface have a same radius of curvature; and the fourth incident surface is planar.

15. An optical system, comprising:

a display configured to display video;

a controller configured to direct a video signal to the display to be displayed on the display;

a near-eye waveguide configured to operably guide light toward a human eye;

a projection lens having a positive total refractive power and configured to direct light from the displayed video in a light ray bundle from the display into the near-eye waveguide, the projection lens having an optical axis that corresponds to a center of the light ray bundle, the projection lens comprising:

a right-angle prism positioned along the optical axis adjacent the display, the right-angle prism configured to angularly divert the optical axis by ninety degrees, the right-angle prism being formed from a crown glass having a refractive index greater than or equal to 1.728 at a wavelength of 587.6 nm and an Abbe number greater than 50;

a first lens element positioned along the optical axis and formed from a first glass having a refractive index between 1.72 and 1.85 at a wavelength of 587.6 nm and an Abbe number between 40 and 55, the first lens element having a convex spherical first incident surface facing the right-angle prism and a convex spherical first exiting surface facing away from the display, wherein the first incident surface, the first exiting surface, and the first glass define a refractive power of the first lens element to be positive and between 88% and 128% of the total refractive power;

a second lens element positioned along the optical axis and formed from second glass having a refractive index between 1.72 and 1.85 at a wavelength of 587.6 nm and an Abbe number between 38 and 55, the second lens element having a convex spherical second incident surface facing the first lens element and a concave spherical second exiting surface facing away from the first lens element, wherein the second incident surface, the second exiting surface, and the second glass define a refractive power of the second lens element to be positive and between 35% and 68% of the total refractive power, wherein the refractive power of the second lens element, divided by the refractive power of the first lens element, is between 0.28 and 0.71;

a third lens element positioned along the optical axis and formed from a third glass having a refractive index greater than 1.8 at a wavelength of 587.6 nm and an Abbe number between 20 and 24, the third lens element having a concave spherical third incident surface facing the second lens element and a concave spherical third exiting surface facing away from the second lens element, the third incident surface and the third exiting surface having a same radius of curvature, wherein the third incident surface, the third exiting surface, and the third glass define a refractive power of the third lens element to be negative and between 165% and 216% of the total refractive power;

a fourth lens element positioned along the optical axis and formed from a fourth glass having a refractive index greater than 1.85 at a wavelength of 587.6 nm and an Abbe number between 28 and 35, the fourth lens element having a convex spherical or planar fourth incident surface facing the third lens element and a convex spherical fourth exiting surface facing away from the third lens element toward the near-eye waveguide, wherein the fourth incident surface, the fourth exiting surface, and the fourth glass define a refractive power of the fourth lens element to be positive and between 87% and 125% of the total refractive power, wherein the refractive power of the fourth lens element, divided by the refractive power of the third lens element, is between − 0.64 and −0.49; and an achromatic prism positioned along the optical axis between the fourth lens element and the near-eye waveguide, the achromatic prism configured to angularly divert the optical axis by an angle between seven degrees and nine degrees;

wherein the first incident surface, the first exiting surface, the second incident surface, the second exiting surface, the third incident surface, the third exiting surface, and the fourth exiting surface have centers that are collinear along the optical axis.

16. The optical system of claim 15, wherein:

the first incident surface, the first exiting surface, and the first glass define a refractive power of the first lens element to be positive and between 112% and 128% of the total refractive power;

the second incident surface, the second exiting surface, and the second glass define a refractive power of the second lens element to be positive and between 35% and 54% of the total refractive power;

the third incident surface, the third exiting surface, and the third glass define a refractive power of the third lens element to be negative and between 183% and 216% of the total refractive power;

the fourth incident surface, the fourth exiting surface, and the fourth glass define a refractive power of the fourth lens element to be positive and between 91% and 125% of the total refractive power;

the refractive power of the second lens element, divided by the refractive power of the first lens element, is between 0.28 and 0.46; and the refractive power of the fourth lens element, divided by the refractive power of the third lens element, is between −0.60 and −0.49.

* * * * *